D. BOURQUE.
SNAP FASTENER SOCKET.
APPLICATION FILED APR. 15, 1921.
1,432,660. Patented Oct. 17, 1922.
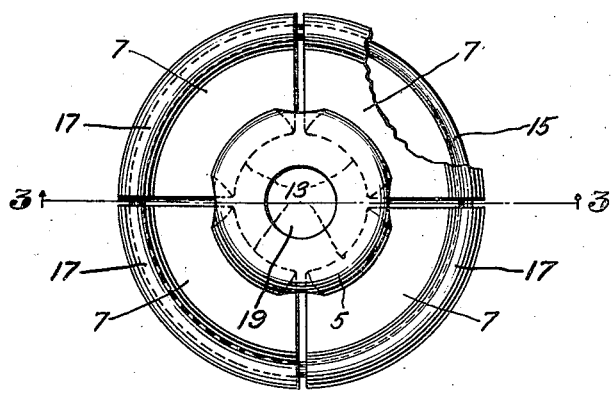
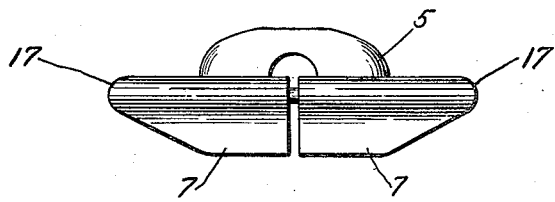
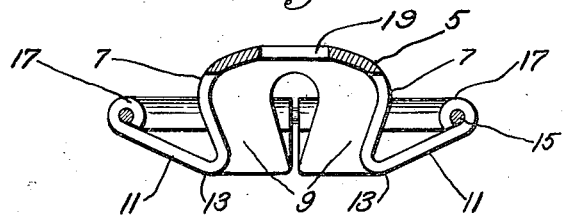
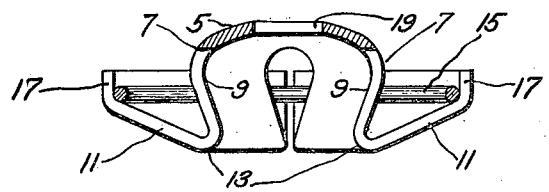
Inventor:
David Bourque.
By Emery, Booth, Janney & Varney
Attys.

Patented Oct. 17, 1922.

1,432,660

UNITED STATES PATENT OFFICE.

DAVID BOURQUE, OF AMESBURY, MASSACHUSETTS, ASSIGNOR G. W. J. MURPHY COMPANY, OF AMESBURY, MASSACHUSETTS, A CORPORATION OF MASSACHUSETTS.

SNAP-FASTENER SOCKET.

Application filed April 15, 1921. Serial No. 461,512.

*To all whom it may concern:*

Be it known that I, DAVID BOURQUE, a citizen of the United States, and a resident of Amesbury, county of Essex, and State of Massachusetts, have invented an Improvement in Snap-Fastener Sockets, of which the following description, in connection with the accompanying drawings, is a specification, like characters on the drawings representing like parts.

This invention relates to fasteners and the purpose more particularly is to provide an improved form of female or socket element for a snap fastener.

My invention will best be understood by reference to the following description of an illustrative embodiment thereof shown by way of example in the accompanying drawings, wherein:

Fig. 1 is a plan view of a socket element constructed in accordance with my invention with part broken away;

Fig. 2 is a side elevation thereof;

Fig. 3 is a section on the line 3—3 of Fig. 1; and

Fig. 4 is a view similar to Fig. 3 showing the socket in an intermediate stage of its construction.

Referring to the drawings, the socket element here shown utilizes in its construction a main body formed from a single piece of sheet metal and embodying a connecting portion 5 with which are formed integrally a plurality of arms 7. In the example of the invention shown the connecting element 5 is disposed centrally and the arms 7 radiate outwardly therefrom, forming a centric group adapted to close upon the enlarged head of a stud member of any desired form. To provide for resiliency and a grasping jaw for the socket member the arms 7 are bent or cranked and herein (see Fig. 3) are first inclined inwardly at 9 and then extended outwardly at 11 to provide the elbows 13 which cooperate as shown in Fig. 1 to provide a nearly complete ring forming a restricted entrance to the space defined by the parts 9 through which entrance the enlarged head of a stud may snap.

The fastener comprising the part 5 and the radiating arms 7 may obviously be constructed by simple stamping operations from a piece of sheet metal. The arms have inherent resiliency as the cranking of the arms which causes them to act as springs. However, this quality can not be properly utilized if the individual arms bend as a whole about the point of connection thereof with the connecting portion 5. To prevent undue yielding of the arms in this manner while permitting the fastener to be constructed by a simple dieing operation I provide as a separate element a restraining device for the arms.

Preferably this restraining element takes the form of an endless ring 15 of wire to which the ends of the arms 7 opposite the connecting part 5 are secured. Referring to Fig. 4, the ends of the arms may be flanged as indicated at 17, the flanges 17 forming as interrupted cylinder and the ring 15 may be dropped into the interior of these flanges as indicated in Fig. 4 and the flanges upset or rolled over the ring in the manner shown in Fig. 3, thus securing the outer ends of the arms 7 and holding them permanently to the circumference of the ring. By this means the yielding of the arms is restricted to the resiliency provided for by their cranked form and undue weakness of the fastener is avoided.

As has been pointed out, the construction is such as to facilitate the manufacture of the fastener, the sheet metal part being conveniently formed by a stamping or pressing operation. The fact that initially one end of each of the arms 7 is free permits the fastener to be brought to the form shown in Fig. 4 very easily and without undue strain on the metal. The rings may be conveniently assembled with the sheet metal part by automatic machinery, for example, being picked from raceways and the flanges 17 upset by suitable dies. As indicated in the drawing in a device formed as shown with arms 7 radiating outwardly from a central part 5, this part 5 may be made annular providing the central opening 19 facilitating the handling of the parts and providing a convenient means for fastening the jaw within a housing if desired.

Having described in detail the particular form of my invention shown in the accompanying drawings, what I claim as new and desire to secure by Letters Patent I shall express in the following claim.

A socket element for a fastener comprising a centric series of arms inclining inwardly and then extending outwardly and a ring about which the extremities of the arms are crimped.

In testimony whereof, I have signed my name to this specification.

DAVID BOURQUE.